United States Patent
Lozano (10) Patent No.: US 10,340,545 B2
(45) Date of Patent: Jul. 2, 2019

(54) METHOD AND APPARATUS FOR CONVERTING CHEMICAL ENERGY STORED IN WASTEWATER INTO ELECTRICAL ENERGY

(71) Applicant: BioEnergySP, Inc., Spencer, NY (US)

(72) Inventor: Jose Luis Lozano, Spencer, NY (US)

(73) Assignee: BioEnergySP, Inc., Spencer, NY (US)

( * ) Notice: Subject to any disclaimer, the term of this patent is extended or adjusted under 35 U.S.C. 154(b) by 531 days.

(21) Appl. No.: 14/938,258

(22) Filed: Nov. 11, 2015

(65) Prior Publication Data
US 2017/0133700 A1  May 11, 2017

(51) Int. Cl.
*H01M 8/16* (2006.01)
*H01M 8/0202* (2016.01)

(52) U.S. Cl.
CPC ........... *H01M 8/16* (2013.01); *H01M 8/0202* (2013.01); *Y02E 60/527* (2013.01)

(58) Field of Classification Search
CPC .............................. H01M 8/16; H01M 8/0202
See application file for complete search history.

(56) References Cited

U.S. PATENT DOCUMENTS

| | | |
|---|---|---|
| 5,413,713 A | 5/1995 | Day et al. |
| 6,177,736 B1 | 1/2001 | Raiser |
| 6,936,170 B2 | 8/2005 | Shieh et al. |
| 7,572,546 B2 | 8/2009 | Karamanev |
| 8,277,984 B2 | 10/2012 | Logan |
| 8,354,267 B2 | 1/2013 | Barkeloo et al. |
| 8,524,402 B2 | 9/2013 | He et al. |
| 8,722,216 B2 | 5/2014 | Ng et al. |
| 8,962,165 B2 | 2/2015 | Logan |
| 9,029,025 B1 | 5/2015 | Salguero et al. |
| 2006/0060475 A1 | 3/2006 | Applegate et al. |
| 2006/0147763 A1 | 7/2006 | Angenent et al. |
| 2007/0259217 A1 | 11/2007 | Logan |
| 2010/0112380 A1 | 5/2010 | Li |
| 2010/0119879 A1 | 5/2010 | Girguis et al. |
| 2010/0200495 A1 | 8/2010 | Borole et al. |
| 2010/0203361 A1 | 8/2010 | Premier et al. |

(Continued)

FOREIGN PATENT DOCUMENTS

| | | |
|---|---|---|
| CN | 101383425 A | 3/2009 |
| EP | 2264816 B1 | 10/2013 |

(Continued)

OTHER PUBLICATIONS

Liu et al.: "Continuous flow Microbial Fuel Cell for Organic Wastewater Treatment" Advanced Materials Research vol. 777 (2013) pp. 92-95.

(Continued)

*Primary Examiner* — Jane J Rhee
(74) *Attorney, Agent, or Firm* — Alfred Y. Chu, Esq.; Brian B. Shaw, Esq.; Harter Secrest & Emery LLP (57) ABSTRACT

A method and apparatus is provided for harvesting electricity from a biofilm retained in a zero chamber, no interphase container, the biofilm having a portion supporting aerobic microbial activity and a second portion supporting anaerobic microbial activity, wherein the first and the second portion are in direct physical contact. A power harvester is electrically connected, directly or indirectly, to the second portion of the biofilm.

29 Claims, 8 Drawing Sheets

(56) References Cited

U.S. PATENT DOCUMENTS

| | | | |
|---|---|---|---|
| 2010/0304226 A1 | 12/2010 | Keller et al. | |
| 2011/0011829 A1 | 1/2011 | Usui et al. | |
| 2011/0076519 A1 | 3/2011 | Chandran et al. | |
| 2012/0082868 A1 | 4/2012 | Huang et al. | |
| 2012/0115045 A1 | 5/2012 | Kapopara et al. | |
| 2014/0030555 A1 | 1/2014 | Winkler | |
| 2014/0057136 A1 | 2/2014 | Greenman et al. | |
| 2014/0150415 A1 | 6/2014 | Zhang et al. | |
| 2014/0255729 A1* | 9/2014 | Sheridan | H01M 4/8605 429/2 |
| 2014/0287272 A1 | 9/2014 | Chang et al. | |
| 2014/0315046 A1 | 10/2014 | Yoshida et al. | |
| 2015/0182881 A1 | 7/2015 | Wright | |
| 2015/0182887 A1 | 7/2015 | Wright | |
| 2015/0183657 A1 | 7/2015 | Wright et al. | |
| 2015/0183658 A1 | 7/2015 | Wright et al. | |
| 2015/0251934 A1 | 9/2015 | Bretschger | |

FOREIGN PATENT DOCUMENTS

| | | |
|---|---|---|
| KR | 20120119690 A | 10/2012 |
| WO | 2011011829 A1 | 2/2011 |
| WO | 2014144705 A2 | 9/2014 |
| WO | 2014150415 A1 | 9/2014 |

OTHER PUBLICATIONS

Marsili, et al.: "Microbial Biofil Voltammetry: Direct Electrochemical Characterization of Catalytic Electrode-Attached Biofilms" (Applied and Enviromental Microbiology, Dec. 2008 p. 7329-7337).

Eric A. Zielke: "Design of a single chamber Microbial Fuel Cell" (Dec. 15, 2005) 35 pages.

Cheng, et al.: "Increasing power generation for scaling up single-chamber air cathode microbial fuel cells" (Bioresource Technology 102 (2011) 4468-4473).

Santoro, et al.: "Power generation from wastewater using single chamber microbial fuel cells (MFCs) with platinum free cathodes and pre-colonized anodes" Biochemical Engineering Journal 62 (2012) 8-16.

Wang, et al.: "Microbial community structures differentiated in a single-chamber air-cathode microbial fuel cell fueled with rice straw hydrolysate" (Biotechnology for Biofuels 2014, 7:9).

Jain, et al.: "Extracellular Electron Transfer Mechanism in Shewanella Ioihica PV-4 Biofilms Formed at Indium Tin Oxide and Graphite Electrodes" (Int. Electochem. Sci. 8 (2013) 1778-1793).

Villaseñor, et al.: "Operation of a horizontal subsurface flow constructed wetland—Microbial fuel cell treating wastewater under different organic loading rates" (Water Research 47 (2013) 6731-6738).

Cristiani et al.: "Cathodic and anodic biofilms in Single Chamber Microbial Fuel Cells" (Bioelectrochemistry 92 (2013) 5-13).

Zhang, et al.: "Electricity generation in a microbial fuel cell with a microbially catalyzed cathode" (Biotechnol Lett (2008)30:1771-1776).

Liu, et al.: "Production of Electricity during Wastewater Treatment Using a Singel Chamber Microbial Fuel Cell" (Envir. Sci. Technol. 2004. 38, 2281-2285).

Liu, et al.: Integration of microbial fuel cell with independent membrane cathode bioreactor for power generation, membrane fouling mitigation and wastewater treatment: (International Journal of Hydrogen Energy 39 (2014) 17865-17872.

Oon, et al: "Hybrid system up-flow constructed wetland integrated with microbial fuel cell for simultaneous wastewater treatment and electricity generation" (Bioresource Technology 186 (2015) 270-275).

CN 103825041A Google translation (May 28, 2014) 3 pages Single-chamber and film-free anaerobic type microbial fuel cell for processing acidic mine wastewater.

Santoro et al.: "Power generation from wastewater using single chamber microbial fuel cells (MFCs) with platinum-free cathodes and pre-colonized anodes"—Accepted Manuscript (Dec. 14, 2011) 36 pages.

PennState Research—BioEnergy (website): dated Aug. 13, 2015 (2 pages) http://www.engr.psu.edu/ce/enve/logan/bioenergy/mfc_patent.htm.

PennState Research—BioEnergy (website): dated Aug. 13, 2015 (6 pages) http://www.engr.psu.edu/ce/enve/logan/bioenergy/research_mfc.htm.

SunSaver Photovoltaic System Controllers Operator's Manual Morningstar Corporation (16 pages) 1987.

SunSaver PV System Controllers Installation and Operation Manual Morningstar Corporation (45 pages) 2015.

SunSaver PV System Controllers Installation and Operation Manual Morningstar Corporation (44 pages) 2011.

Nealson et al.: "Electron flow and biofilms" (5 pages) MRS Bulletin • vol. 36 • May 2011.

Kim et al.: "Enrichment of microbial community generating electricity using a fuel-cell-type electrochemical cell" Mar. 28, 2003 (1 page).

Marsili et al.: Microbial Biofilm Voltammetry: Direct Electrochemical Characterization of Catalytic Electrode-Attached Biofilms (1 page) Jan. 18, 2008.

International Search Report and Written Opinion of the International Searching Authority in corresponding International Application No. PCT/US2016/061226, dated Jan. 30, 2017 (11 pages).

\* cited by examiner

METHOD AND APPARATUS FOR CONVERTING CHEMICAL ENERGY STORED IN WASTEWATER INTO ELECTRICAL ENERGY

BACKGROUND OF THE INVENTION

Field of the Invention

The present disclosure relates to a method and apparatus for converting chemical energy stored in wastewater into electrical energy, and particularly to a zero chamber, no interface system electrically interconnecting a biofilm to a power harvester.

Description of Related Art

The use of microbial fuel cells (MFCs) to generate electricity from organic substances provides numerous benefits including operation at ambient temperatures and pressures. Moreover, because the oxidation reactions which occur in a MFC typically do not require aeration, MFCs generally have reduced power requirements. The lack of aeration may hamper the breakdown of organic compounds (Cheng H et al. 2015 Water Research 81(72-83) in traditional chambered MFCs).

Traditional two-chamber MFCs typically use an anode chamber and a separate cathode chamber. In general, these chambers are separated by a proton exchange membrane (PEM) and are electrically connected through an external circuit. In the anode chamber, bacteria generate electrons and gain energy for growth by oxidizing available nutrients. Electricity is then typically produced by transferring the generated electrons to the anode. Protons created as a result of the oxidation migrate through the proton exchange membrane and combine with the electrons in the presence of oxygen at the cathode to form water in the cathode chamber. In such MFCs, the electrodes may include various forms of conductive material, for example carbon paper or carbon cloth, such as those manufactured by the E-TEK Division of BASF Fuel Cell, Inc. while materials such as a sulfonated tetrafluorethylene copolymer (e.g., Nafion) may be used as exchange membranes in two-chamber MFCs. Electrodes may be further enhanced with catalysts, such as platinum (Pt), to improve their performance.

A single-chamber MFC includes an open ended chamber having both an anode and a cathode, but lacks an exchange membrane. The two electrodes are typically fixed at opposite ends of the chamber, with the anode embedded at the base of the chamber, and a two-sided cathode forming an interphase with a water-tight seal on an end of the chamber, wherein the chamber is filled with biodegradable nutrients and bacteria.

While the single-chamber MFC offers benefits over the two chamber MFC, the single-chamber MFC still requires two electrodes, typically of specialty materials. The single chamber MFC also creates the interphase, wherein one face of the cathode is exposed to the air while a second face of the cathode is exposed to the wastewater, wherein the interphase provides a passage for oxygen diffusion. In addition, the electrode spacing in these systems restricts scaling the chambers to commercial sizes or capacities.

BRIEF SUMMARY OF THE INVENTION

The present disclosure provides a zero compartment, no interphase fuel cell, wherein electric current is harvested from a biofilm to an electrical ground.

In one configuration, a method is provided including forming a biofilm on a substrate exposed to wastewater having dissolved oxygen, the biofilm having a sufficient thickness to define a gradient between aerobic microorganisms (bacteria) exposed to the wastewater and anaerobic microorganisms (bacteria) proximal to the substrate; and electrically connecting the anaerobic microorganisms (bacteria) to a power harvester.

In a further configuration, a microbial fuel cell is provided having a container for retaining a volume of wastewater, the wastewater including dissolved oxygen; a substrate at least partially submerged in the wastewater, the substrate supporting a biofilm exposed to the volume of organic wastewater, the biofilm having a sufficient thickness to define an electron concentration gradient between microorganisms (bacteria) exposed to the wastewater and microorganisms (bacteria) proximal to the substrate; a power harvester; and a first electrical conductor between the power harvester and one of (a) the biofilm and (b) the substrate.

Also provided is a microbial fuel cell having a container retaining a volume of wastewater, the container being free of a proton exchange membrane and the wastewater including dissolved oxygen; a substrate at least partially submerged in the wastewater, the substrate supporting a biofilm exposed to the volume of organic wastewater, the biofilm having a sufficient thickness to define an oxygen concentration gradient between microorganisms (bacteria) exposed to the wastewater and microorganisms (bacteria) proximal to the substrate; a power harvester; a first electrical conductor between the power harvester and one of (a) the biofilm and (b) the substrate; and a second electrical conductor between the power harvester and a ground.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

DETAILED DESCRIPTION OF THE INVENTION

For purposes of the present disclosure, the term "aerobic" refers to conditions in a container, or containers, where there is an amount of dissolved oxygen sufficient to sustain an aerobic microbial growth.

For purposes of the present disclosure, the term "anaerobic" refers to conditions in a container, or containers, where oxygen is absent or there is insufficient oxygen to (i) provide aerobic microbial activity or (ii) poison anaerobic microbial activity. Often, anaerobic conditions refer to an environment where only anaerobic microorganisms can survive.

For purposes of the present disclosure, the term "biofilm" refers to an aggregate of living micro-organisms which are connected and/or immobilized onto a substrate as microbial colonies. The microbes are typically embedded within a self-secreted matrix of extracellular substance. Biofilms may form on living, non-living, organic, or inorganic substrates. The present biofilms are electroactive biofilms as they possess specific electroactive properties such as electron generation.

For purposes of the present disclosure, the term "container" refers to vessels or reservoirs that support a biologically active microbial environment, and typically retain a volume of wastewater and/or allow for biomass conversion via microorganism metabolism within the container. A container may provide for various macro-environmental conditions, such as, but not limited to, gas content, e.g., air, oxygen (or lack of oxygen), nitrogen (or lack of nitrogen), carbon dioxide, flow rates, temperature, pH, light intensity, and agitation speed/circulation rate. Containers can be of any size, shape, or material, and of any configuration that will physically retain a sufficient volume of wastewater capable of sustaining a biofilm capable of electricity generation. Acrylic compartments, for example, are suitable for smaller, laboratory scale embodiments, while compartments made of steel may also be used in large scale production.

For purposes of the present disclosure, the term "electrode" refers to an anode or a cathode. The "anode" is an electrode that facilitates the oxidation, i.e., the loss of electrons, of various nutrients in biomass. For example, the wastewater may contain one or more saccharides which are oxidized by bacteria, i.e., electrogenic bacteria, at the anode. The "cathode" is an electrode that facilitates the reduction, i.e., gaining of electrons, of an oxidant, typically oxygen.

For purposes of the present disclosure, the term "wastewater" 70 refers to, but is not limited to, groundwater, contaminated groundwater, sewage, graywater, landfill leachate, sugar refinery waste, paper pulping waste, bakery waste, brewery waste, fluid compositions containing bacterial factors, organic matter, wood or wood waste, straw, herbaceous crops, corn stover, grass such as switch grass, or other sources of annual or perennial grass, paper or paper waste, pulp and paper mill waste, municipal and/or industrial solid wastes, and/or fluid compositions comprising bacterial factors, or any combination thereof having organic and/or inorganic compounds or materials that contain a source of energy for bacteria, e.g., electrogenic bacteria. The wastewater 70 typically contains waste contaminants that are broken down into simple sugars and other bioconstituents to support electrogenic culture growth in the present container. As such, in concert with the electrogenic cultures, the wastewater 70 provides a supply of electrons for generating electricity while sustaining electrogenic bacterial culture growth and metabolism. Further, the wastewater 70 is aerobic or oxygen carrying, having in certain configurations, a dissolved oxygen content at least 1.0 mg/L. The oxygen level is sufficient to sustain aerobic microbial activity within the container 10.

"Cultured" microorganisms include those grown and developed in any of the known growth media cultures, such as but not limited to Bennett's medium, Marine broth, Mannitol agar and nutrient agar. Culturing is performed and modified, as desired, for suitable applications requiring a particular density and/or confluence, which can be for about 1 to 50 days. For example, as known, the bacteria are cultured until a desired cell density is attained.

Figure 1:
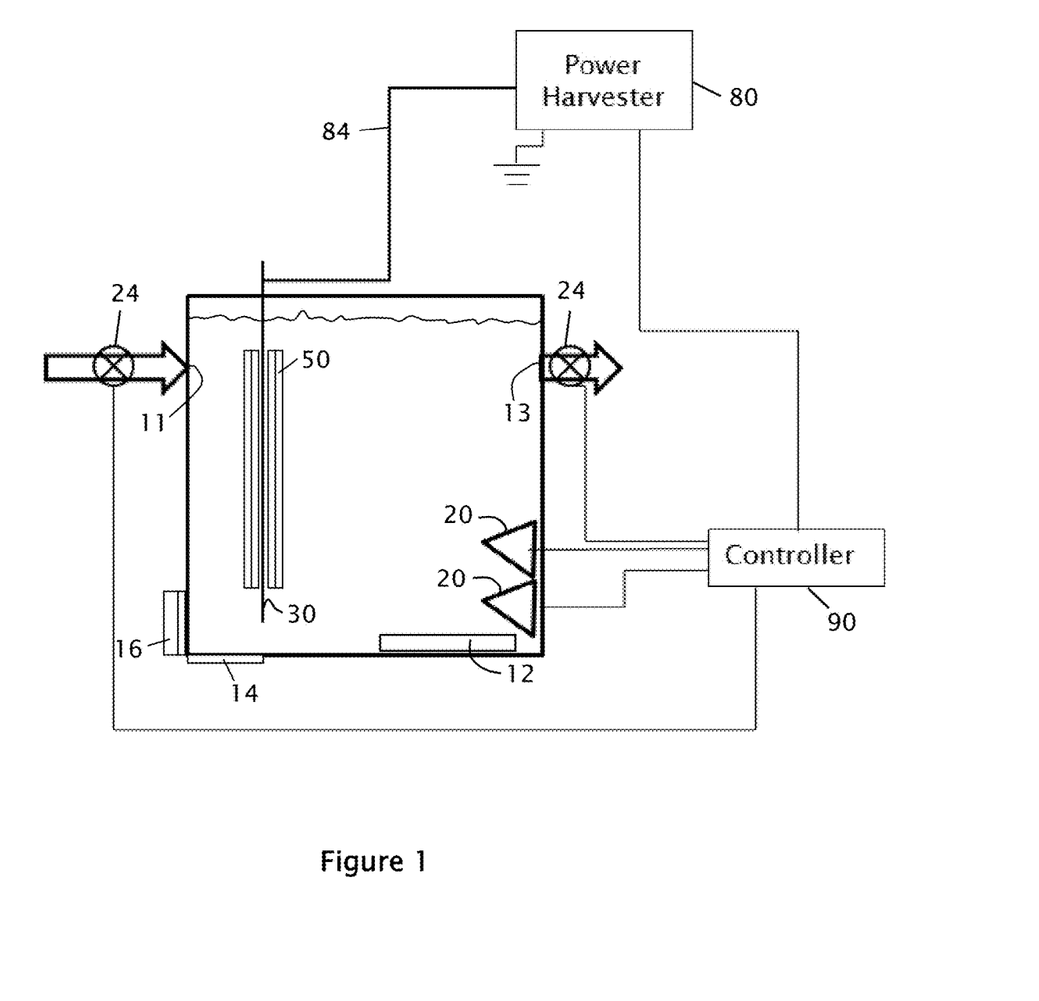
FIG. 1 is a schematic representation of the present system.
Figure 2:
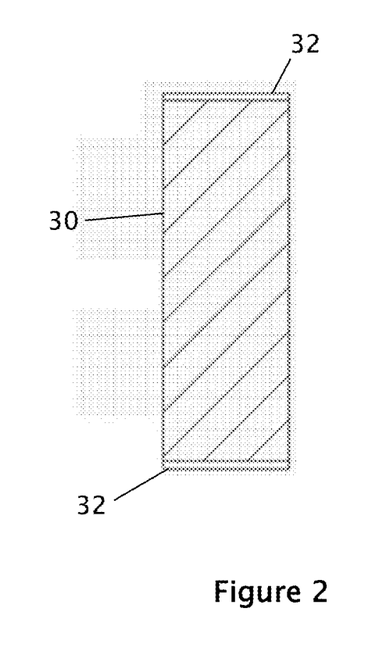
FIG. 2 is a front view of a representative substrate.
Figure 3:
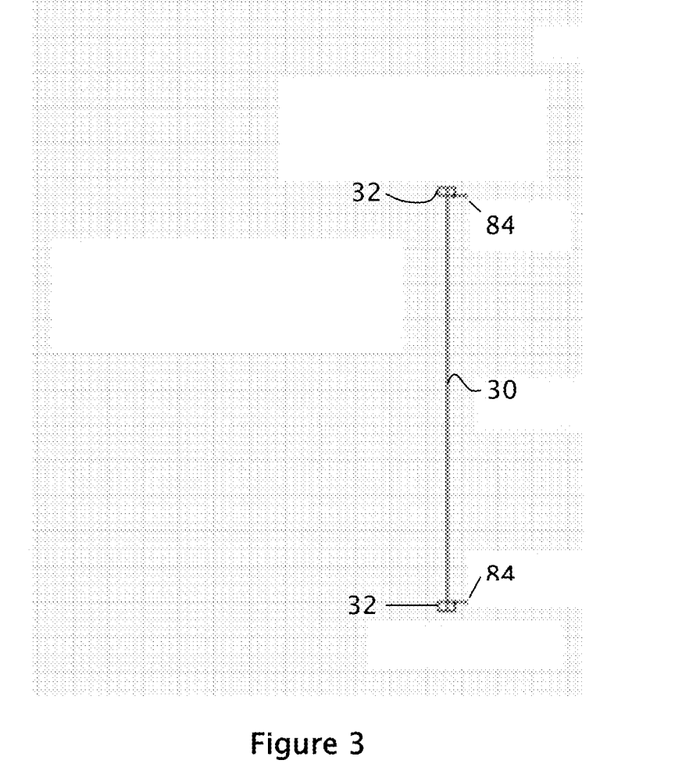
FIG. 3 is a side view of the representative substrate of FIG. 2.
Figure 4:
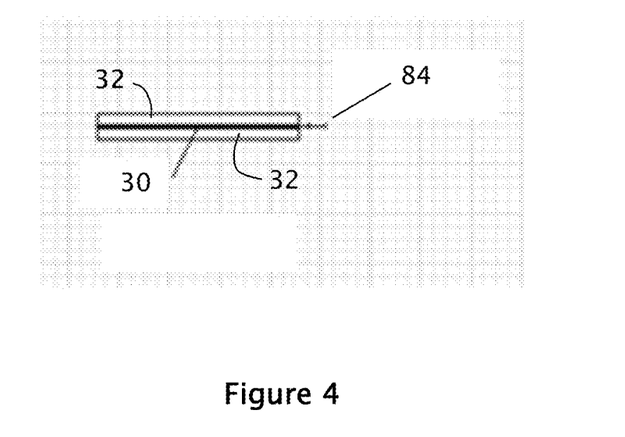
FIG. 4 is a top view of the representative substrate of FIG. 2.
Figure 5:
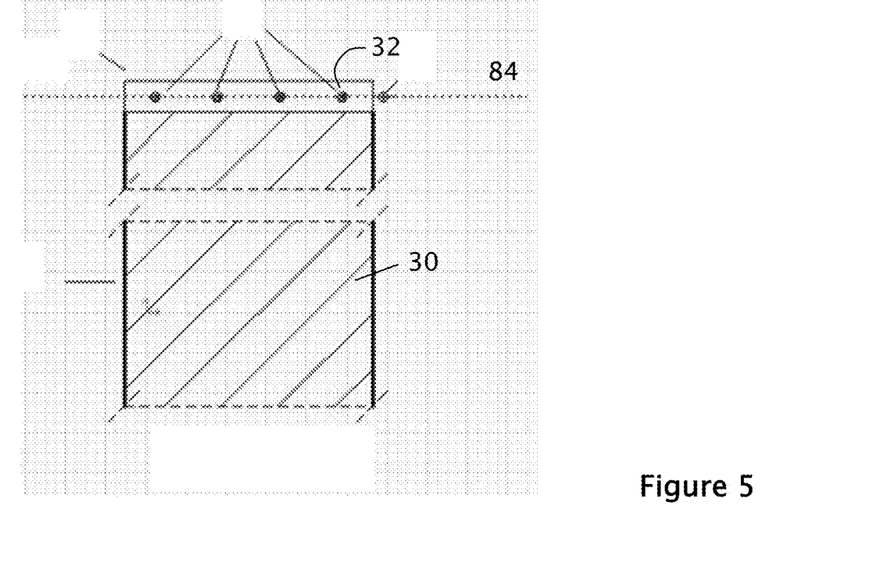
FIG. 5 is an enlarged front view of a portion of the representative substrate.
Figure 6:
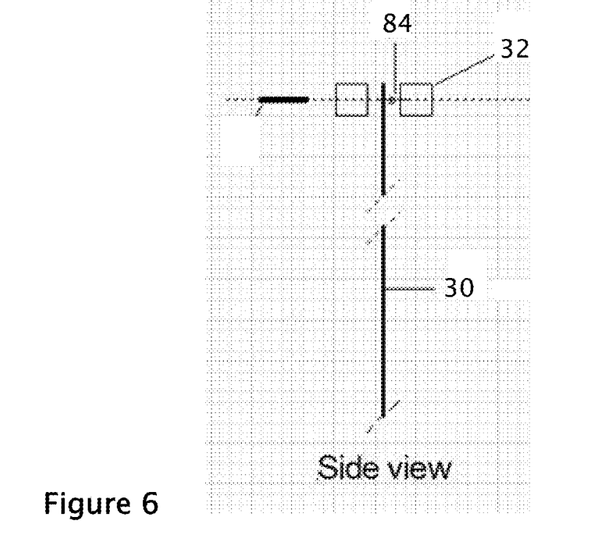
FIG. 6 is an enlarged side view of a portion of the representative substrate.

Referring to FIG. 1, the present system includes a container 10 and a substrate 30 supporting a biofilm 50 in a volume of wastewater 70.

In select configurations, the biofilm 50 is electrically connected to a load, such as but not limited to a power harvester 80 as set forth below.

Although not required, it is anticipated that for purposes of automation a plurality of sensors 20, such as temperature, pH, oxygen sensors, current or voltage meters can be operably connected to the wastewater (either upstream, downstream, or within the container) and/or the biofilms 50. The sensors 20 can include sensors to detect any parameter of the wastewater 70 including those above as well as chemical constituents, conductivity, sound velocity or any other characteristic of the wastewater. In select configurations, the system can further include flow control devices 24, such as valves.

In addition, select configurations can include an aerator 12 located to increase dissolved oxygen in the wastewater 70 as well as heaters 14 and chillers 16 for selectively heating or cooling the wastewater.

In these further select configurations, a controller 90 can be operably connected, either wirelessly or wired, to the sensors 20, the flow control devices 24, the aerator 12, the heaters 14, the chillers 16, and the power harvester 80.

The container 10 defines a zero chamber microbial (microorganism) fuel cell (MFC), as the container does not include membranes or electrochemical dividers. In addition, select configurations of the container 10 do not include an interphase. However, it is understood the container 10 may include or define compartments wherein the compartments are fluidly connected and share a common flow of wastewater 70. The container 10 can be formed of any of a variety of the materials including electrically conductive, such as metal or alloy or nonconductive, such as polymeric.

The container 10 includes an inlet 11 for receiving wastewater 70 and an outlet 13 for passing wastewater. The container 10 can be open topped or closed, wherein the inlet 11 and the outlet 13 are physically spaced apart in the container. It is contemplated the inlet 11 and outlet 13 can be integrally formed with the container 10 or provided by corresponding pipes providing an inlet of wastewater 70 and the outlet of wastewater. Inlet and outlet valves 24 are operably connected to the respective inlet 11 and outlet 13 for selectively controlling the flow of wastewater 70 in, or through, the container 10.

The container 10 does not include an interphase for oxygen diffusion. Thus, the container 10 does not require expanse oxygen permeable materials and can be readily scaled as it merely needs to retain a designed volume and/or flow of wastewater.

Figure 9:
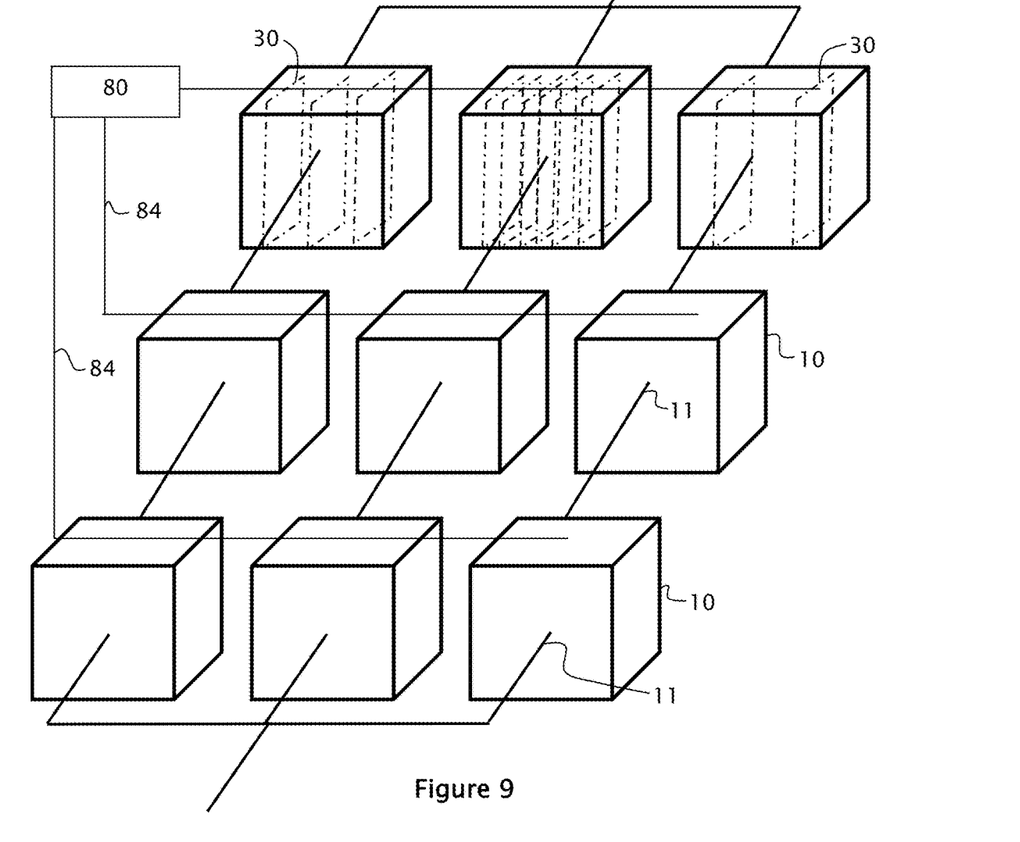
FIG. 9 is a schematic of an array of an alternative representative scaling.

It is understood an array of containers 10 can be employed as seen in FIG. 9, wherein the flow through the containers is serial or parallel, depending in part on the constituents of the wastewater and microbial makeup of the biofilms 50. Thus, in one configuration the outlet of a first container is connected to the inlet of a second container. Alternatively, an inlet manifold can be used to distribute available wastewater to a plurality of containers. Similarly, an outlet manifold can be employed to release wastewater from the array.

The containers 10 are not constrained by different requirements of the wastewater 70. That is, no preconditioning step is required prior to introduction of a container 10 or a given container within the container array. The volume of an individual container 10 or container array can be any size as determined by the anticipated volume or flow of wastewater 70.

As set forth above, one configuration employs wastewater 70 having a material dissolved oxygen content, and particularly a content of at least 1.0 mg/L. However, it is understood, the dissolved oxygen content can be supplemented or imparted by bubbling air through the wastewater 70 prior to entering the container 10, while in the container or both prior to entering and within the container.

The flow of wastewater 70 through the container 10 can be continuous, intermittent or batch. So long as the necessary oxygen content and nutrients for the biofilm 50 are provided, the flow can be selected as desired.

The substrate 30 is selected to physically support the biofilm 50. The substrate 30 can be conductive or nonconductive. In one configuration, the substrate is a carbon fiber mesh, such as commercial material McMaster-Carr 87365K13. Alternatively, the substrate 30 can be conductive such as a wire mesh or even a sheet or a plate. As seen in FIGS. 2-7, a support 32 can be connected to a portion of the substrate 30. While the substrate 30 can include catalysts as known in the art, in the present configuration, a catalyst is not necessary, thus the substrate can be catalyst free.

While the substrate 30 is shown as a substantially planar member as seen in FIGS. 2-7, it is understood the substrate can be sufficiently flexible or bendable to be folded or convolute. In alternative constructions, a flexible planar substrate 30 can be wound or formed into a spiral profile. This increases the area/volume of biofilm relative to container volumes.

The biofilm 50 is supported by or carried by the substrate 30 and includes a first portion 52 supporting aerobic microbial activity and a second portion 54 supporting anaerobic microbial activity, wherein the first and the second portion are in direct physical contact. In one configuration, the first portion 52 of the biofilm 50 overlies the second portion 54 of the biofilm and substantially precludes exposure of the second portion to dissolved oxygen in the wastewater. In this configuration, the biofilm 50 includes an aerobic layer 52 and an anaerobic layer 54, wherein the aerobic layer is exposed to the wastewater 70 and sufficiently covers or overlays the anaerobic layer to preclude aerobic activity in the anaerobic layer. That is, the aerobic layer 52 effectively creates the anaerobic layer 54 as available oxygen cannot pass through the aerobic layer to the anaerobic layer.

In one configuration, the biofilm 50 includes electrogenic bacteria capable of moving electrons to solid phase materials including electrodes through the breakdown of organic matter, wherein the electron transfer is to the surrounding environment, i.e., an anode, rather than an electron acceptor such as oxygen. Such electrogenic bacteria are capable of completely oxidizing organic compounds to carbon dioxide or other byproducts and then transferring the electrons derived from the oxidation to a remaining portion of the biofilm.

It is contemplated the boundary between the aerobic layer 52 and the anaerobic layer 54 may be defined by a gradient, wherein the dimension of the gradient is relatively small, less than ⅓ of the thickness of the biofilm 50. In one configuration, the biofilm 50 has a thickness between approximately 0.5 mm to approximately 0.75 mm. However, it is understood the thickness of the biofilm 50 is at least partly dictated by the content of the wastewater 70 as well as the makeup of the biofilm.

Figure 10:
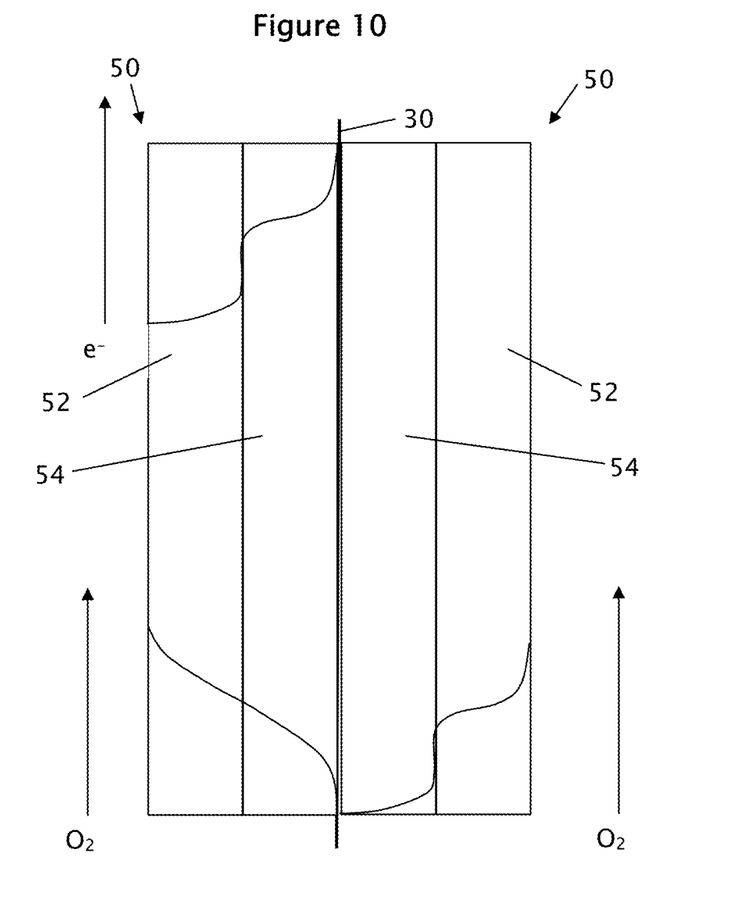
FIG. 10 is a schematic cross section of a biofilm.

The biofilm 50 defines a free electron concentration gradient between the aerobic layer 52 and the anaerobic layer 54, as schematically shown in FIG. 10. In one configuration, this electron gradient is directly (by an electrical conductor) or indirectly (through the substrate) electrically connected to the power harvester 80. It is further contemplated the electron flow may occur from the anaerobic layer 54, as this layer acts like a conductor of electrons.

The biofilm 50 can be formed of native, cultured, wild, or any configuration of microbes.

The power harvester 80 can be a low voltage-low current harvester connected to any of a variety of commercially available devices that utilize, convert or store energy from an electron flow. A satisfactory power harvester 80 includes those sold by Morningstar Corporation of Newtown, Pa., including the SunSaver™ line of photovoltaic converters. The power harvester 80 also includes a resistive load electrically intermediate the biofilm and ground.

The electrical connection between the power harvester 80 and the biofilm 50 can be provided by an electrical conductor 84, wherein the electrical conductor extends directly from the power harvester to the biofilm, such as the anaerobic portion, or indirectly to the conductive substrate. Further, the electrical connection of the electrical conductor 84 to the biofilm 50 can be at a single contact point in the biofilm or at a plurality of contact points.

In those configurations employing an electrically conductive substrate 30, the electrical connection between the power harvester 80 and the biofilm 50 can include the substrate. Thus, the electrical connection extends between the substrate 30 and the power harvester 80. As in the direct connection to the biofilm 50, the electrical connection to the substrate 30 can be at a single contact point or through a plurality of contact points.

The biofilm 50 is electrically connected to the positive (+) terminal of the power harvester 80. The negative (−) lead of the power harvester 80 is connected to ground. A battery and load can be connected pursuant to the operating instructions of the power harvester. Thus, only a single electrical conductor 84 connects the biofilm 50 to the power harvester 80 and a second electrical conductor connection with the container 10, biofilm 50, substrate 30 or wastewater 70 is not necessary.

Referring to FIG. 10, the biofilm 50 includes a sufficient thickness to create an electrochemical barrier within the biofilm, wherein a sufficient gradient is created between the portion of the biofilm exposed to the oxygen bearing wastewater as the aerobic layer 52 and the underlying portion of the biofilm that is the anaerobic layer 54. By virtue of the oxygen gradient within the biofilm 50 and hence gradient between the aerobic microbial activity in the biofilm exposed to the wastewater 70 and the anaerobic microbial activity, an electrical potential gradient is created within the biofilm. Depending upon the substrate 30, the electric potential can be taken from the anaerobic layer 54 of the biofilm 50 or the substrate 30 (if conductive).

A specific configuration is shown in FIGS. 2-6, wherein the substrates are substantially rectangular having the upper and lower supports 32. While the present substrates 30 are shown having the supports 32, it is understood that depending on the particular material of the substrate and the intended exposure to the wastewater 70, the substrates can be self-supporting or connected to a full frame for maintaining the orientation of the substrate within the wastewater.

Figure 7:
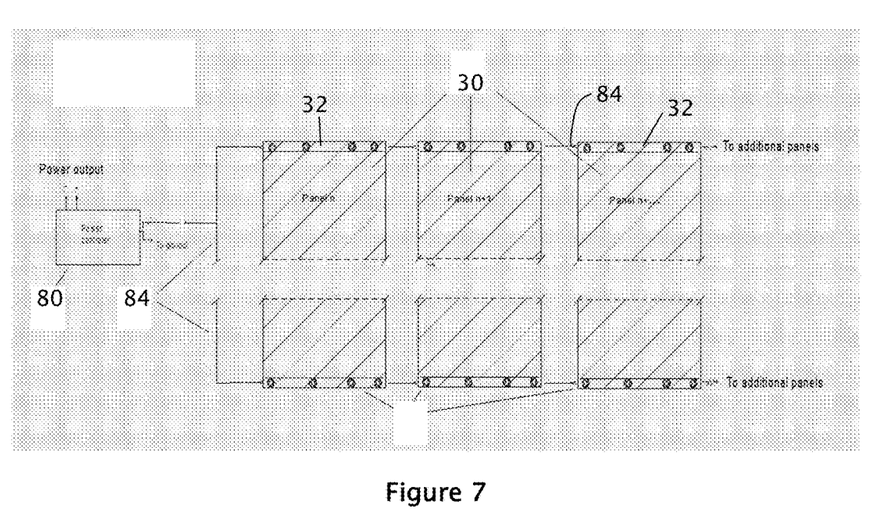
FIG. 7 is a schematic representation showing representative scaling.
Figure 8:
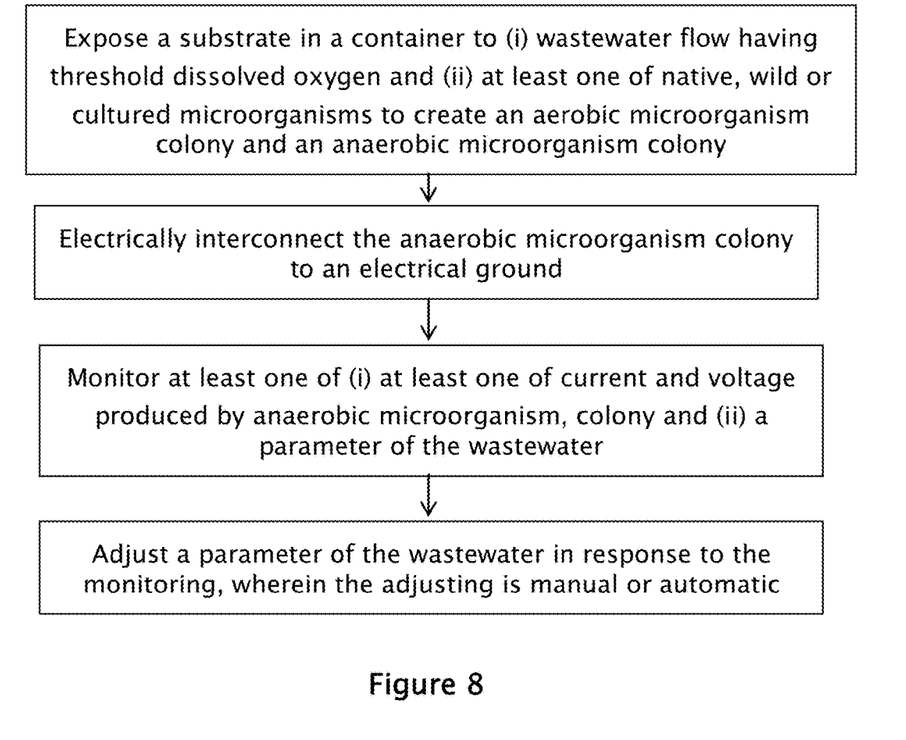
FIG. 8 is a flow chart of a method encompassing the present process.

As stated above and shown in FIG. 7, each substrate 30 can include a plurality of electrical connections to the power harvester 80. The substrates 30, and hence biofilms 50, can be electrically connected in series or parallel in their electrical connection to the power harvester 80.

As each substrate 30 need only be electrically connected to the power harvester 80, the inclusion of additional substrates does not present any scaling issues. Further, as each substrate 30 can include a plurality of electrical connections or can include the electrical conductor 84, the size of the available substrates for a given flow rate of wastewater 70 can be readily changed.

The controller 90 is operably connected to the power harvester 80, the aerator 12, the flow controls 24, the heater/chiller 14, 16, and the sensors 20. The controller 90 can be programmed to adjust the flow of the wastewater 70 relative to the biofilms 50 as well as possible mixing of wastewater streams to provide a substantially predetermined oxygen content and nutrient content to the container 10. The controller 90 can be a dedicated processor or an applicator on a host. The generation of electrical current (or voltage) measured by the meters and monitored by the controller 90 provides an indicator of nutrient consumption (and hence nutrient availability). The controller 90 can then increase flow of wastewater 70 to the biofilms 50 to increase nutrient availability or decrease flow of wastewater to increase percentage of nutrients consumed. Similarly, the controller 90 monitoring the temperature, oxygen level and pH can make corresponding adjustments to the temperature parameters to increase or maintain an efficiency of the system.

The controller 90 can be programmed to provide specific actions in response to predetermined readings from the sensors 20. For example, if the pH of the wastewater 70 is outside a predetermined range, the controller 90 can prompt the addition of alkaline or basic material to adjust the pH, particularly in view of monitored flow rate and microbial activity.

In operation, the wastewater 70 and the substrate 30 are located within the container 10 to contact the substrate with the wastewater. As the biofilm 50 can be formed from wild microbes, sufficient exposure time is provided between the wastewater 70 and the substrate 30 to develop the biofilm having an aerobic layer overlying an anaerobic layer.

The biofilm 50 develops to define the aerobic layer 52 exposed to the dissolved oxygen and nutrients in the wastewater 70, wherein the aerobic layer overlies a layer of developing anaerobic microbes. As the oxygen gradient is created in the biofilm 50, an electrochemical barrier is effectively formed within the biofilm and an electrical potential gradient is created across the thickness of the biofilm.

The electrical conductor 84 either directly electrically connects the biofilm 50, such as the anaerobic layer 54, to the power harvester 80 or indirectly electrically connects the biofilm via the substrate 30, and to the power harvester. A ground lead is then connected to the power harvester 80. It is contemplated the ground lead of the power harvester 80 can be electrically connected to the container 10 or the wastewater 70.

The wastewater 70 is then exposed to the biofilm 50 either in continuous, intermittent or batch flows.

The electrons harvested from the biofilm 50 generate an electrical current which is captured by the power harvester 80. Therefore, in contrast to prior MFC, including single chamber configurations, the present system does not employ a membrane, such as a proton exchange membrane or polymer electrolyte membrane (PEM). As the container 10 is free of a PEM, the cost as well as the complexity of the physical system is reduced. As the present electron potential is created within the biofilm 50 itself, rather than across discrete electrodes as in prior designs, there is no decrease in performance of the present system from biofilm growth on a cathode surface.

Further, as the present system is operable in a zero chamber configuration, there is no need for separate containers or barriers to harvest the power.

In addition, as the present system employs a single electrical connection to the container 10, the increased cost and complexity of electrode pairs for each container is removed. That is, the present system does not require a separate anode and cathode. The lack of a separate anode and cathode further reduces the cost and complexity of the present system.

Though not meant to be bound to any theory of the operation, it is believed the separate electrodes and membranes of the prior devices are functionally equivalent to the created electrochemical gradient across the thickness of the biofilm 50, between the aerobic layer 52 and the anaerobic layer 54 of the biofilm 50, as shown schematically in FIG. 10. The surface of the biofilm 50 is in contact with the oxygen dissolved in the wastewater, while the bottom of the biofilm, which is in contact with the anode, develops an oxygen deficiency caused by the bacteria within the overlying biofilm. The aerobic bacteria consume oxygen during their normal respiration, shielding the interior of the biofilm 50 from the available oxygen in the wastewater. This forms an oxygen concentration gradient between the surface layer and the underlying layer of the biofilm 50, as well as an electron concentration gradient, with electrons flowing into the biofilm from the surface of the biofilm. The specific profile of the oxygen and electron gradients are at least partly determined by the development of the biofilm as well as the oxygen content of the wastewater 70. The gradients shown are merely representative.

Filamentous bacteria, acting as electron shunts across the biofilm 50, facilitate the electron flow from the surface of the biofilm towards the anode, creating an electron-rich zone at the cathode of the zero chamber MFC. The present system thus takes advantage of the recognition that an electrochemical gradient exists within a biofilm 50, wherein an electrical current can be harvested.

The present system provides a single electrode in contact with the wastewater 70 or the container 10, wherein only a ground is necessary to harvest power in the form of an electron flow from the biofilm 50. In one configuration, the anode is covered with the biofilm 50 and the effective cathode is an electric ground. The zero-compartments MFC, has one electrode, the anode, and no distinct compartments or interphase. The anode is covered by the biofilm 50, and the "virtual" cathode is an electric ground. An electric current between the anode and ground is created by oxidation reactions occurring within the biofilm.

This disclosure has been described in detail with particular reference to a presently preferred embodiment, but it will be understood that variations and modifications can be effected within the spirit and scope of the disclosure. The presently disclosed embodiments are therefore considered in all respects to be illustrative. The scope of this disclosure is indicated by the appended claims, and all changes that come within the meaning and range of equivalents thereof are intended to be embraced therein.

The invention claimed is:

1. A method comprising:
   (a) forming a biofilm on a substrate exposed to a volume of wastewater having dissolved oxygen, the biofilm having a sufficient thickness to define a gradient between aerobic microorganisms exposed to the wastewater and anaerobic microorganisms proximal to the substrate;
(b) electrically connecting the biofilm to a power harvester, the power harvester being free of an electrical connection to a separate cathode; and
(c) electrically connecting the power harvester to a ground lead.

2. The method of claim 1, further comprising electrically connecting the substrate to the power harvester.

3. The method of claim 1, wherein the ground lead is further electrically connected to at least one of the wastewater and a container retaining the volume of wastewater.

4. The method of claim 1, wherein electrically connecting the biofilm to a power harvester includes electrically connecting the substrate to the power harvester.

5. The method of claim 1, wherein the volume of wastewater is independent of a PEM membrane.

6. The method of claim 1, wherein the volume of wastewater is independent of a catalyst.

7. The method of claim 1, wherein the volume of wastewater is retained in a container, and the container is independent of an interphase for oxygen diffusion.

8. The method of claim 1, wherein the wastewater is organic.

9. The method of claim 1, wherein electrically connecting the biofilm includes electrically connecting a portion of the anaerobic microorganisms to the power harvester.

10. A microbial fuel cell comprising:
(a) a container for retaining a volume of wastewater, the wastewater including dissolved oxygen;
(b) a substrate at least partially submerged in the wastewater, the substrate supporting a biofilm exposed to the volume of organic wastewater, the biofilm having a sufficient thickness to define an electron concentration gradient between microorganisms exposed to the wastewater and microorganisms proximal to the substrate;
(c) a power harvester; and
(d) a first electrical conductor between the power harvester and one of (i) the biofilm and (ii) the substrate, wherein the power harvester is free of an electrical connection to a separate cathode.

11. The microbial fuel cell of claim 10, further comprising a second electrical conductor between the power harvester and a ground.

12. The microbial fuel cell of claim 10, wherein the substrate is conducting.

13. The microbial fuel cell of claim 10, wherein the substrate is non-conducting.

14. The microbial fuel cell of claim 11, wherein the ground is the wastewater.

15. The microbial fuel cell of claim 11, wherein the ground is the container.

16. The microbial fuel cell of claim 10, wherein the container is independent of a proton exchange membrane.

17. The microbial fuel cell of claim 10, wherein the container is independent of a catalyst.

18. The microbial fuel cell of claim 10, wherein the container is independent of an interphase for oxygen diffusion.

19. The microbial fuel cell of claim 10, wherein the container is independent of a membrane compartment.

20. A microbial fuel cell comprising:
(a) a container retaining a volume of wastewater, the container being free of a proton exchange membrane and the wastewater including dissolved oxygen;
(b) a substrate at least partially submerged in the wastewater, the substrate supporting a biofilm exposed to the volume of organic wastewater, the biofilm having a sufficient thickness to define an oxygen concentration gradient between microorganisms exposed to the wastewater and microorganisms proximal to the substrate wherein the gradient is sufficient to generate sufficient free electrons;
(c) a power harvester;
(d) a first electrical conductor between the power harvester and one of (a) the biofilm and (b) the substrate; and
(e) a second electrical conductor between the power harvester and a ground, wherein the power harvester is free of an electrical connection to a separate cathode.

21. The microbial fuel cell of claim 20, wherein the substrate is conducting.

22. The microbial fuel cell of claim 20, wherein the substrate is non-conducting.

23. The microbial fuel cell of claim 20, wherein the ground is the wastewater.

24. The microbial fuel cell of claim 20, wherein the ground is the chamber.

25. The microbial fuel cell of claim 20, wherein the ground is a common electrical ground.

26. The microbial fuel cell of claim 20, wherein the container is independent of a proton exchange membrane.

27. The microbial fuel cell of claim 20, wherein the container is independent of a catalyst.

28. The microbial fuel cell of claim 20, wherein the container is independent of an interphase for oxygen diffusion.

29. The microbial fuel cell of claim 20, wherein the container is independent of a membrane compartment.

* * * * *